C. J. COLEMAN.
VEHICLE MOVEMENT DETECTOR.
APPLICATION FILED JAN. 24, 1906.
1,010,725.
Patented Dec. 5, 1911.
2 SHEETS—SHEET 1.
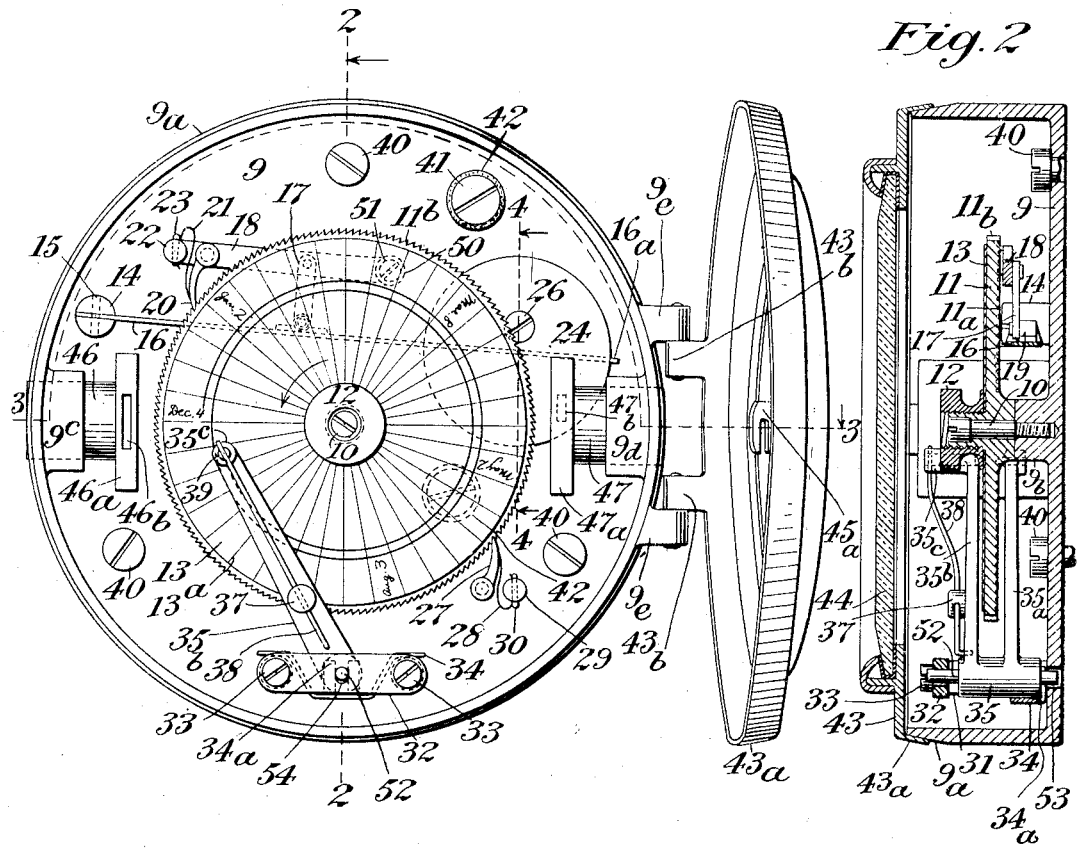
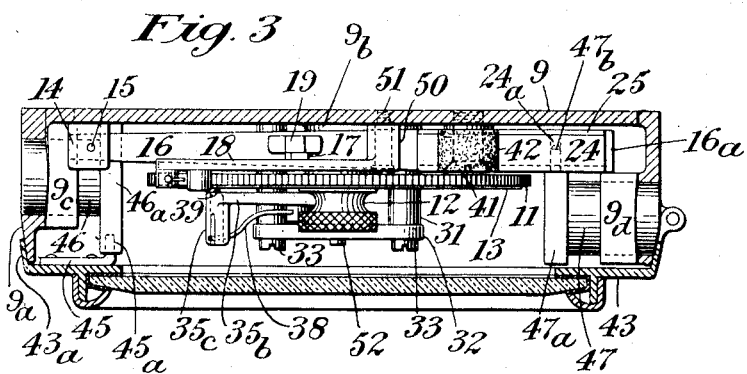
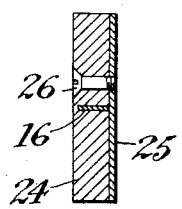
Witnesses:
Albert T Day
Henry Barnes
Inventor:
Clyde J. Coleman
by Henry D. Williams
Atty C. J. COLEMAN.
VEHICLE MOVEMENT DETECTOR.
APPLICATION FILED JAN. 24, 1906.
1,010,725.
Patented Dec. 5, 1911.
2 SHEETS—SHEET 2.
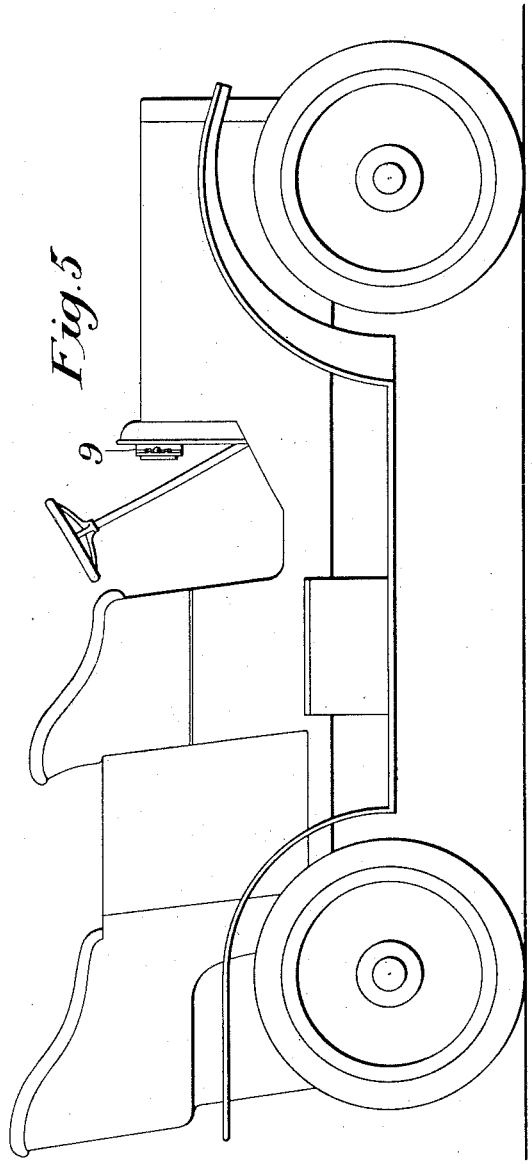
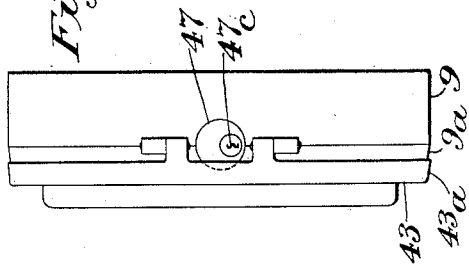
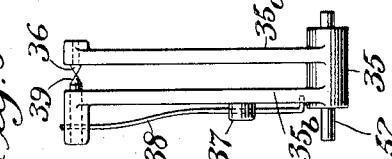
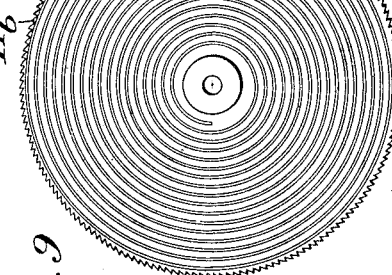
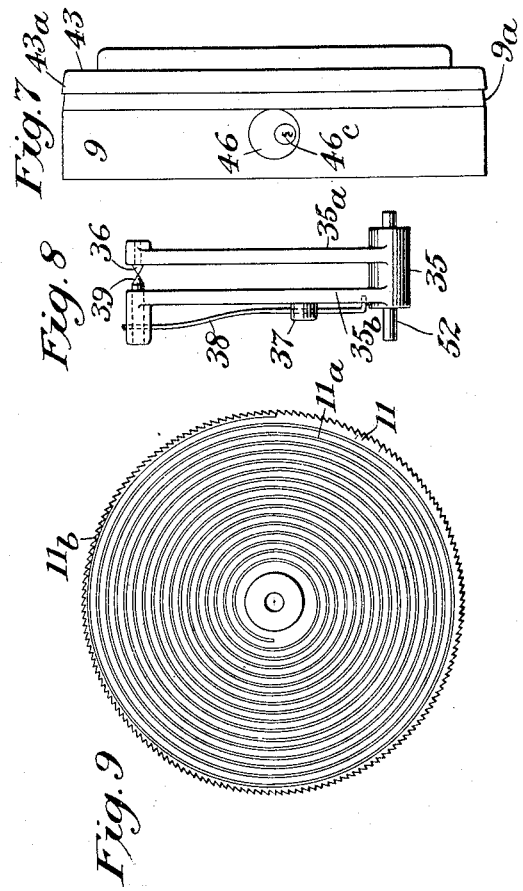
Inventor:
Clyde J. Coleman
by Henry D. Williams
Atty.

UNITED STATES PATENT OFFICE.

CLYDE J. COLEMAN, OF NEW YORK, N. Y., ASSIGNOR TO CONRAD HUBERT, OF NEW YORK, N. Y.

VEHICLE MOVEMENT-DETECTOR.

1,010,725.  Specification of Letters Patent.  Patented Dec. 5, 1911.

Application filed January 24, 1906. Serial No. 297,563.

*To all whom it may concern:*

Be it known that I, CLYDE J. COLEMAN, a citizen of the United States, residing at the borough of Manhattan, city of New York, in the county of New York and State of New York, have invented certain new and useful Improvements in Vehicle Movement-Detectors, of which the following is a specification, reference being had therein to the accompanying drawings, forming a part thereof.

My invention relates to means for detecting the surreptitious use of automobiles or other vehicles by persons having access to such vehicles, but having generally no right to use them. For instance, owners of vehicles, and particularly owners of automobiles, have been subjected to much annoyance and expense by the use and consequent wear and tear of their vehicles stored in liveries or garages in charge of the keepers or employees of such places.

In order that the automobile or other vehicle may be run upon the road or moved by the people of the garage or livery when such use or movement of the vehicle is necessitated by any legitimate circumstance it is necessary that the vehicle shall be always free from all locking devices such as are used to safeguard automobiles against theft when they are stopped and for a time abandoned on the road; and it has been found that the garage or livery keepers or their employees are prone to take advantage of these conditions to surreptitiously use the automobiles or vehicles placed in their charge for their own pleasure or business. The attachment of an ordinary cyclometer or mileage indicator which records the road distance traversed by the vehicle is not adequate to prevent or detect such surreptitious use of the vehicle, because such a cyclometer or mileage indicator can be disconnected from the running gear. There is therefore great need and demand for a detective device which cannot be secretly put out of operation and which will permit the automobile or other vehicle to be moved and run freely, while at the same time indicating or recording such use or movement in a manner which cannot be prevented or concealed by the user, so that the owner of the vehicle may always know when it has been used and demand a legitimate reason for such use.

To satisfy such need and demand is the broad object of my invention.

It is another object of my invention to enable the owner of the vehicle to place the vehicle movement detector in nonoperatable condition when he himself desires to use the machine or when for any other reason he wishes to avoid the operation of the device which records or indicates that the vehicle has been used.

Another object is to enable the vehicle owner to restore the vehicle movement detector to initial condition after the detector has been operated to indicate a use of the vehicle.

Another object is to make a removable permanent visual indication or record of the vehicle's movement, so that the indication or record of vehicle movement or use during a given week, month or other period of time, may be preserved and compared with other indications or records for other corresponding weeks, months, or periods of time, thereby enabling the owner of the vehicle to discover any unusual or excessive use or employment of his vehicle by the person or persons in whose charge it is left.

Another object is to secure the movement detector in place on the vehicle or automobile so that it cannot be removed by any person save the owner, unless by his consent.

The operation of my invention, unlike the ordinary cyclometer, does not rely upon the distance traversed by the vehicle when in use, nor upon the rotation of the running gear.

Broadly designated, my invention comprehends a vehicle, such for instance as an automobile, and a movement-indicating or movement-recording detective apparatus mounted upon or secured to the vehicle and operatable by movement of the vehicle and independently of the rotation of its running gear to leave a record or indication of the movement or use of the vehicle; and the illustrated embodiment of my invention includes such a detective apparatus responsive to non-uniform movement of the vehicle to produce an indication or record of such non-uniform movement and thus leave an indication that the vehicle has been used. By such illustrated embodiment of my invention various non-uniform movements produced in the vehicle when it is running, such as the jolting or jarring of the vehicle due to inequalities of the road, the vibration of an automobile produced by the running of the engine, and other non-uniform movements, are available to operate the detective apparatus without reliance on any transmission of motion from the running gear.

The illustrated embodiment of my invention includes also, as a component of the detective means above mentioned, apparatus for making a visual indication, preferably a permanent visual indication, of the use or non-uniform movement of the vehicle, and includes means for making such permanent indication in the form of a graphic linear record of the use or non-uniform movement of the vehicle, and in the preferred construction illustrated such graphic linear record is removable from the detective apparatus and may be separately filed or preserved.

My invention, in its illustrated embodiment, also includes an inertia member, that is to say, a member movable by its own inertia relative to the vehicle or automobile, and secured to the vehicle by means of a flexible connection which, in the specific form illustrated, is a resilient mounting, the inertia member by its own inertia being caused to move to vibrate relative to the vehicle when the vehicle is subjected to a non-uniform movement, e. g., when the vehicle is jolted on the road or when the vehicle throbs or vibrates from the running of the engine, if the vehicle be an automobile, and means for producing an indication of the movement of the inertia member relative to the vehicle, which indication remains and may be read or noted after the vehicle has been used.

Another important feature of my invention is a casing for the detective apparatus provided with locking means for keeping the casing closed, and an attaching device adapted to connect the casing to the vehicle and arranged to be disconnected only from the inside of the casing, that is to say, only by access to the inside of the casing, the illustrated embodiment of this feature consisting in screw holes formed in the wall of the casing and adapted to receive attaching screws which are inserted into some portion of the vehicle and have their heads inside the casing, thus forming a connection between the casing and the vehicle to which access can be had only through the casing and after unlocking the same. Hence, when the owner of the vehicle locks the casing of the detector, he is assured that no person can remove the detector unless he be provided with a key for opening the casing to secure access to the attaching screws.

Another feature of my invention is a lock operatable only by a key, which may be held by the owner of the vehicle and arranged to lock the detective apparatus in inoperative position or condition so that the owner, when so desiring, may use the vehicle or automobile, or may permit another to use the same, without leaving any record of such use in the detective apparatus. The illustrated embodiment of this feature of my invention consists in a lock operatable by a pocket key and arranged to lock the inertia member or vibrator in immovable position relative to the vehicle.

Another feature of my invention is the provision of two means for locking the casing in closed condition and for locking the detector in inoperative condition, both locks being adapted to receive a common key.

Various objects and features of my invention which are not particularly enumerated in the foregoing preamble will appear clearly in the light of the following description of that particular model of my invention which I have illustrated in the accompanying drawings, in which—

Figure 1 is a front elevation of one detective apparatus embodying the features of my invention, the casing cover being shown thrown open. Fig. 2 is a middle sectional elevation of the detector shown in Fig. 1, the casing cover being closed in Fig. 2, and the view point of Fig. 2 being at the right of Fig. 1 and the plane of section being that indicated by the line 2—2 of Fig. 1. Fig. 3 is a sectional plan view of the detector shown in Fig. 1, the casing cover being closed and the line of view being from above Fig. 1 and the surface of the section being partially plane and partially cylindrical as indicated by the line 3—3 of Fig. 1. Fig. 4 is a middle sectional elevation of the inertia member or vibrating weight of the detector, the view point being at the right of Fig. 1 and the plane of section being that indicated by the line 4—4 of Fig. 1. Fig. 5 is a side elevation of an automobile equipped with the detective apparatus of my invention, secured on the dashboard in front of the chauffeur's seat. Fig. 6 is a right elevation of the detective apparatus shown in Fig. 1. Fig. 7 is a left elevation of the same. Fig. 8 is a detail view of the pencil-carrying record marker or indication marker looking at the right side of the marker as it appears in Fig. 1. Fig. 9 is a rear elevation of the ratchet-wheel showing its spiral groove.

The casing 9 is cylindrical, the rear side being closed by an integral plate forming the base plate or back plate of the mechanism, and the front side being closed by a circular cover comprising a circular glass 44 suitably mounted in a metallic ring 43 provided with suitable hinge lugs 43$^b$ hinged to complementary lugs 9$^e$ formed on the cylindrical wall of the casing. The ring 43 is provided also with a flaring rim or apron 43ª which, when the cover is closed, fits closely over a chamfer or bevel 9ª formed on the cylindrical wall of the casing. A catch or hook 45ª is secured on the inner face of the metallic ring 43 diametrically opposite the cover hinge and enters a recess 46ᵇ in the rectangular portion 46ª of a lock having its barrel 46 projecting outward through a hollow lug or boss 9ᶜ formed integrally with the cylindrical wall of the casing and projecting inward therefrom. The lock may be of the type ordinarily known as the Yale lock and serves to lock the cover in closed position. The rear plate of the casing is provided with three holes disposed at equiangular intervals just inside the cylindrical wall and adapted to receive screws such as 40 having their heads inside the casing and projecting outwardly so as to enter the dashboard or any other suitable portion of the automobile. The casing is preferably mounted on the dashboard of a vehicle, as shown in Fig. 5.

A central boss 9ᵇ is formed on the inner side of the back plate and projects into the casing. A stud 10 is centrally screwed into the boss 9ᵇ and has its head countersunk in the outer or front hub of the ratchet-wheel 11, which turns upon the stud and is provided with an inner or rear boss turning against the boss on the back plate. The front hub of the ratchet-wheel is externally threaded. A paper disk 13 having a central perforation, which fits over the threaded front hub of the ratchet-wheel, is secured in place against the front face of the ratchet-wheel by means of a thumb nut 12 screwed upon the front hub and set up firmly against the paper disk.

The vibrator spring 16 is mounted in a split or slotted post 14 inserted in the back plate, the spring being secured by means of a pin 15 passing diametrically through the post 14 and through a hole in the spring. From the post 14 the spring 16 extends over the central mounting of the ratchet-wheel and almost entirely across the inside of the casing. The inertia member or vibrator is a circular or disk-shaped weight divided into two parts or disks 24 and 25. The front disk 24 is much thicker than the rear disk 25, the latter being merely a thin circular plate. The front disk 24 of the weight is provided on its inner surface with a diametrical slot or groove adapted to receive the vibrator spring 16, the front edge of the vibrator spring being flush with the front face of the front disk 24 and such front edge of the spring having a notch as long as the diameter of the weight and in depth equal to the thickness of the front disk between its front face and the bottom of its diametric slot. The rear edge of the vibrator spring 16 is similarly notched to a depth equaling the thickness of the rear disk 25 so that the rear notch in the spring receives the disk 25 when the same is screwed up against the front disk 24 and in register therewith and by means of a screw 26 countersunk in the front disk and entering the back disk 25. The opposing notches in the spring extend almost to its extreme outer or vibrating end 16ª, and the insertion of the opposing disks 24 and 25 into these notches serves to retain the entire vibrator weight in its proper position on the vibrator spring 16.

A non-uniform motion of the casing transmitted from the automobile or other vehicle, such as road jolting or engine vibration, causes the disk weight to vibrate up and down on its resilient mounting formed by the vibrator spring 16, the amplitude of such vibration of the weight being limited by rubber buffers 42 made in the form of bushings mounted on suitable studs 41 screwed into the back plate, the heads being countersunk in the rubber bushings. The vibration of the weight is transmitted through its mounting spring 16 to a link 17, the lower end of which is pivotally connected with a small lug or bracket 19 mounted on the upper side of the vibrator spring about midway between its fixed end and the weight. The link 17 in turn transmits the vibrating movement to a pawl-carrying rock-arm 18 to which the upper end of the link is pivotally secured at a point about midway between the ratchet-driving pawl 20 carried by the rock-arm and the pivotal mounting of such rock-arm, which consists in a stud 51 screwed into the back plate and passing through a hub 50 formed integrally with the rock-arm. The pawl 20 is pivotally mounted on the rock-arm 18 and is held in engagement with the peripheral teeth 11ᵇ of the ratchet-wheel by means of a small spring 21 bearing against the pawl and anchored in a post 22 fixed on the end of the rock-arm 18, the spring being passed through a small diametric hole in the post 22 and secured in place by means of a small cotter pin 23. When the disk weight is vibrated by a non-uniform movement of the vehicle, the pawl 20 is of course vibrated by the rock-arm 18 and impels the ratchet-wheel 11 leftward, a reverse movement of the ratchet-wheel being prevented by a retaining pawl 27 pivotally mounted on the back plate and held in engagement with the toothed periphery of the ratchet-wheel by means of a spring 28 secured by a small cotter pin 30 in the diametric hole of a post 29 also mounted in the back plate. Thus a vibration of the inertia member or weight serves to rotate the ratchet-wheel and the paper disk or dial secured thereon.

To pillars 31 are secured in the back plate below the ratchet-wheel and a yoke 32 is mounted by screws 33 on the outer ends of the pillar, thus spanning the distance between them. The hub 35 of the indication marker or record marker is mounted between the yoke 32 and the back plate by means of a pivot 52 on which the hub 35 is securely fixed, the pivot in turn being loosely mounted in slots 53 and 54 formed in the back plate and the yoke respectively. The indication marker comprises a follower-carrying arm and a pencil-carrying arm 35$^a$ and 35$^b$ respectively which straddle the ratchet-wheel and the paper indication disk or record-receiving dial 13. The follower-carrying arm carries at its free or upper end a small pointed groove-follower 36 which enters a spiral groove 11$^a$ formed in the rear side of the ratchet-wheel 11; and the pencil-carrying arm is provided also at its upper end with an outwardly projecting hollow barrel 35$^c$ in which is inserted a small pencil 39, the barrel 35$^c$ having a diametric slot at its outer end to receive and guide the free end of a small wire spring 38, which bears upon the front or outer end of the pencil so as to press its point inward against the front face of the paper disk or indication-receiving dial 13. The wire spring 38 passes through a small boss formed on the front side of the pencil-carrying arm 35$^b$ near its hub, the fixed end of the wire spring being turned rearwardly into a small hole in such arm 35$^b$. A bent spring 34 passes underneath the rear end of the hub 35 of the indication marker, the ends of the spring being bent upward so as to overlap the upper sides of the pillars 31, and the middle of the spring being provided also with two flaps 34$^a$ projecting upward from the rear edge of the spring and passing behind the rear end of the hub 35 and straddling the loose pivot 52. The outer or front end of the loose pivot 52 bears against the upper end of its slot 54, while the inner or rear end of such pivot pin is raised from the bottom or lower end of its slot 53 by upward pressure of the spring 34 against the inner end of the hub 35. Thus the bent spring 34 tends always to raise the inner end of the hub 35 and develop a moment tending to turn both the follower-carrying and the pencil-carrying arms of the indication marker in the plane of their pivot 52 and outward toward the casing cover. Thus the follower-carrying arm 35$^a$ is pressed outward or forward toward the rear face of the ratchet-wheel 11 so as to keep the pointed follower 36 always in place in the spiral groove 11$^a$ while the detector is in operation. A rearward or inward pressure of the thumb or finger against the front side of the pencil-carrying arm 35$^b$ effects a slight reverse movement or rotation of the indication marker in the plane of its pivot pin and in a direction opposed to the pressure of the spring 34, so as to free the groove-follower 36 from the spiral groove and enable the indication marker to be freely swung about its pivotal axis when it is desired to change the angular position of the indication marker, for instance when it is desired to swing the indication marker leftward to a point just inside the periphery of the indication-receiving or record-receiving dial 13, such being preferably the initial or starting position of the indication marker before the detector has been operated to indicate or record a use of the vehicle. When the indication marker is thus released from the spiral groove and swung upon its pivotal axis, the pencil spring 38 may be raised by the finger at the same time in order to relieve the pressure of the pencil and prevent the same from marking the dial during such free movement of the indication marker.

When it is desired to place the detective apparatus in non-operative condition, the disk weight may be securely locked in fixed position to prevent it from vibrating and impelling the ratchet-wheel, this being effected by a lock comprising a barrel 47 mounted in a hollow lug or boss 9$^d$ projecting inward from the cylindrical wall of the casing, the rectangular or bolt-receiving portion 47$^a$ of the lock being disposed in front of the weight disk 24 and having a bolt 47$^b$ with a beveled end adapted to be projected rearwardly through a bolt-hole in the disk 24 which registers with the lock-bolt 47$^b$ when the vibrator weight comes to rest in normal position. The weight lock 47, like the cover lock 46, may be of the type ordinarily known as the Yale lock, and both locks may be adapted to receive a common key, the key-holes 47$^c$ and 46$^c$ of the two locks being at the outer or exposed ends of their respective barrels.

When it is desired to place the detective apparatus in condition to indicate or record a use of the vehicle, the indication marker is preferably moved to an initial position adjacent to the periphery of the indication-receiving paper dial 13, the vibrating weight is unlocked, and the casing cover is locked. Then as the vehicle is used, the weight vibrates and impels the ratchet-wheel so as to turn the indication-receiving dial 13 leftward, while the indication-marking or recording pencil 39 bears upon the surface of the dial and traces a spiral line which approaches the center of the dial as it winds rightward about such center, the spiral form of line being caused by the gradual approach of the marking pencil toward the center of the dial effected by engagement of the groove-follower 36 with the spiral groove 11$^a$, which gradually draws the groove-follower and its follower-carrying arm 35$^a$ toward the center of the ratchet-wheel as the wheel revolves in its leftward direction. The dial 13 may be divided into sectors by radial lines, such as 13ª, to assist in determining the amount of rotation of the ratchet-wheel and its dial. Since, by merely opening the casing door, the dial is readily accessible to the owner of the vehicle or any person holding his key, a given dial may be readily removed and replaced by another dial, and the dial while in place on the face of the ratchet-wheel may be easily marked by a pocket pencil or pen with any suitable inscription which may add to the convenience of noting the use of the vehicle, for instance inscriptions denoting the date at which the marking pencil was in any particular position on the dial, several of such inscriptions, "Dec. 4", "Jan. 2", "Mar. 8", "May 2", "Aug. 3", being illustrated in Fig. 1.

The detective apparatus of my invention may be so constructed and so sensitively adjusted that it will be operated not only by a jolting of the vehicle on the road, but also by the vibration produced in an automobile by the running of its engine, or the apparatus may be so constructed and adjusted that it will not be operated by running of an automobile engine, but will respond to, and be operated by, the jolting of the vehicle on the road, such latter adjustment being desirable in many cases where the garage keepers are required to run an automobile engine to inspect or adjust the same while the automobile stands in the garage.

Although I have described but one particular embodiment of my broad invention, it will be apparent that such invention may be embodied in various other specific constructions and in various modifications of the illustrated embodiment, all such other embodiments coming, however, fully within the principles, spirit and scope of my invention.

What I claim and desire to secure by Letters Patent is:—

1. A vehicle movement detector comprising a member movable up and down by the non-uniform movement of the vehicle, means for receiving a permanent record of the movement of the vehicle and movably controlled by the movement of the movable member, and locking means arranged to lock the movable member in non-operative position.

2. A vehicle movement detector comprising movement-indicating means responsive to non-uniform movement of the vehicle to leave an indication of the vehicle's movement, a casing inclosing the movement-indicating means, and locking means operatable by one key and arranged both to lock the casing closed and to lock the movement-indicating means in non-operative condition.

3. A vehicle movement detector comprising movement-indicating means responsive to non-uniform movement of the vehicle to leave an indication of the vehicle's movement, a casing inclosing the movement-indicating means, and two separate locks operatable by one key, one being arranged to lock the casing closed and the other being arranged to lock the movement-indicating means in non-operative condition.

4. Apparatus for detecting the use of vehicles comprising a weight and a flexible mounting for the weight arranged to permit the weight to be moved by non-uniform movement of the vehicle, a wheel arranged to rotate with an indication dial, impelling means for the wheel controllable by the movement of the weight, and a marker bearing upon the indication dial to trace thereon a linear indication of the use of the vehicle.

5. Apparatus for detecting the use of vehicles comprising a weight and a flexible mounting for the weight arranged to permit the weight to be moved by non-uniform movement of the vehicle, a wheel arranged to rotate with an indication dial, impelling means for the wheel controllable by the movement of the weight, and a marker also movable under control of the weight and cooperative with the dial to mark thereon an indication of the use of the vehicle.

6. Apparatus for detecting the use of vehicles comprising a weight and a flexible mounting for the weight arranged to permit the weight to be moved by non-uniform movement of the vehicle, a wheel arranged to rotate with an indication dial, impelling means for the wheel controllable by the movement of the weight, and a marker movable by the wheel in a direction non-circumferential to its casing and bearing upon the dial to trace thereon a spiral linear indication of the use of the vehicle.

7. Apparatus for detecting the use of vehicles comprising a weight and a flexible mounting for the weight arranged to permit the weight to be moved by non-uniform movement of the vehicle, a wheel provided with a spiral groove in one face and carrying an indication dial, impelling means for the wheel controllable by the movement of the weight, and an indication-marking device including a follower inserted in the spiral groove to move the device in a direction non-circumferential to the wheel axis and including also a marker bearing upon the dial to trace thereon a spiral linear indication of the use of the vehicle.

8. Apparatus for detecting the use of vehicles comprising a weight and a flexible mounting for the weight arranged to permit the weight to be moved by non-uniform movement of the vehicle, a wheel provided with a spiral groove in one face and carrying an indication dial, impelling means for the wheel controllable by the movement of the weight, an indication-marking device including a follower inserted in the spiral groove to move the device in a direction non-circumferential to the wheel axis and including also a marker bearing upon the dial to trace thereon a spiral linear indication of the use of the vehicle, and means for disconnecting the follower from the spiral groove to permit the indication-marking device to be returned to initial position.

9. A vehicle movement detector comprising a weight and a flexible mounting for the weight arranged to permit the weight to be moved by non-uniform movement of the vehicle, means for receiving a permanent record of the movement of the vehicle and movably controlled by the movement of the weight, and locking means arranged to lock the weight in non-operative position.

10. A vehicle movement detector comprising a marker engaging a dial, means for determining the relative movements of the dial and the marker to cause the latter to inscribe a spiral on the dial, and means responsive to vibration of the vehicle and operating to rotate the dial and elongate said spiral substantially in proportion to the extent of movement of the vehicle.

In testimony whereof I have affixed my signature in presence of two witnesses.

CLYDE J. COLEMAN.

Witnesses:
HENRY R. WILLIAMS,
BERNARD COWEN.